United States Patent [19]

Knurr et al.

[11] Patent Number: 5,022,219
[45] Date of Patent: Jun. 11, 1991

[54] CONDITIONER ROLLER PRESSURE RELEASE SYSTEM FOR MOWER CONDITIONER

[75] Inventors: Randal Knurr, Kewaskum; Wilbur Groeneveld, West Bend, both of Wis.

[73] Assignee: Gehl Company, West Bend, Wis.

[21] Appl. No.: 517,249

[22] Filed: May 1, 1990

[51] Int. Cl.⁵ .......................................... A01D 82/00
[52] U.S. Cl. .................................. 56/16.4; 100/70 A; 267/177
[58] Field of Search ................. 56/DIG. 1, 1, 16.4; 460/62; 100/70 A; 267/73, 74, 175, 177

[56] References Cited

U.S. PATENT DOCUMENTS

| | | | |
|---|---|---|---|
| 3,377,036 | 4/1968 | McNatt et al. | 267/74 X |
| 3,628,810 | 12/1971 | Graet | 267/177 X |
| 4,040,344 | 8/1977 | Moore et al. | 56/1 X |
| 4,159,105 | 6/1979 | Vande Laan et al. | 267/177 X |
| 4,519,188 | 5/1985 | Webster et al. | 56/DIG. 1 X |
| 4,653,736 | 3/1987 | Pontoppidan | 267/73 |
| 4,830,395 | 5/1989 | Foley | 267/177 X |
| 4,896,483 | 1/1990 | O'Halloran et al. | 56/1 |

Primary Examiner—William P. Neuder
Attorney, Agent, or Firm—Andrus, Sceales, Starke & Sawall

[57] ABSTRACT

A conditioning implement having first and second conditioning rolls, one of which is movably mounted, includes a mounting system for selectively urging the movable roll toward the other roll. The mounting system includes a pair of mounting plates adapted for placement one on either side of the movable roll, with the mounting plates being pivotably mounted to a frame. An adjustment subassembly is connected to the mounting plates. In a first position, the adjustment subassembly exerts a maximum biasing force on the mounting plates for urging the movable roll toward the other roll with a maximum biasing force. In a second position, the adjustment subassembly relieves the biasing force exerted on the mounting plates, thus allowing movement of the movable roll away from the other roll to accommodate passage of a mass of material therethrough. A system is provided for interconnecting the adjustment subassembly with a lifting and lowering system for the conditioner.

21 Claims, 3 Drawing Sheets

CONDITIONER ROLLER PRESSURE RELEASE SYSTEM FOR MOWER CONDITIONER

BACKGROUND AND SUMMARY

This invention relates to an apparatus and method for controlling the biasing force exerted by a spring, and has particular application to a device such as a crop conditioner in which a rotatable roller is movably mounted to a frame for movement toward and away from another roller. A spring is employed to bias the movable roller toward the other roller, and the invention is utilized to control the biasing force exerted by the spring.

An implement for mowing and conditioning a crop, such as hay, typically employs a forward cutting assembly for mowing the crop and a pair of rollers between which the mown crop passes. The rollers have irregular mating surfaces which act to crimp the crop passing therethrough, in a process known as conditioning, to quicken drying of the crop.

A spring and chain assembly is employed to urge the rollers toward each other. In the past, a manual mechanical adjustment system has been incorporated into the spring and chain assembly to adjust the biasing force on the rollers. Such a system typically employs a turnbuckle or the like, which can be manually moved to a desired position when the implement is not in operation.

At times during operation of a mower conditioner, a mass of material is encountered which is too large to pass through the rollers. In the past, it has been necessary to cease operation of the implement and to manually remove the mass from in front of and between the rollers, thereafter resuming operation. This is a slow and time-consuming procedure.

The present invention has as its object to eliminate the inconvenience of the above-described procedure and to provide an automatic system for adjusting the biasing force on the rollers. A further object of the invention is to simplify the construction and operation of a mower conditioner, while providing improved operating characteristics.

In accordance with the invention, a mower conditioner or other device has a first roller movably mounted to a frame for movement toward and away from a second roller rotatably mounted to the frame. A mounting system is provided between the ends of the first roller and the frame for allowing movement of the first roller relative to the frame. In a preferred embodiment, the ends of the first roller are rotatably supported by a mounting plate, which is pivotably mounted to the frame. An adjustment subassembly is interconnected between the mounting plates.

The adjustment subassembly preferably comprises a spring having one end connected to one of the mounting plates through a suitable connection system. In addition, the adjustment subassembly includes a base having an extendable and retractable member mounted thereto, with the extendable and retractable member being mounted to the other end of the spring. The base is connected to the other mounting plate through a suitable connection system. In a preferred embodiment, the base comprises a fluid-operated cylinder, and the extendable and retractable member comprises a piston having a rod connected thereto, with the end of the rod being secured to an end of the spring. The cylinder is selectively connectable to a source of fluid pressure and to a reservoir. When fluid pressure is supplied to the cylinder, the rod is retracted so as to extend the spring. When this occurs, the biasing force exerted by the spring on the mounting plates through the connection system urges the first roller toward the second roller. When the cylinder is connected to reservoir fluid and pressure in the cylinder is relieved, the biasing force of the spring causes the cylinder rod to extend, thus relieving the biasing force exerted on the mounting plates. When this occurs, the rollers are operated to move the mass of material therethrough by allowing movement of the first roller away from the second roller.

While the aspect of the invention set forth immediately above has been and will be described in the context of a mower conditioner having a movable roller, it is to be appreciated that this aspect of the invention may also be satisfactorily employed in any other application in which a spring or other biasing member is utilized to exert a biasing force, and adjustment of the biasing force exerted by the spring is desired.

In accordance with another aspect of the invention, a lifting and lowering system is employed for moving the frame of the mower conditioner between an upper inoperative position and a lower operative position. The adjustment subassembly is interconnected with the lifting and lowering system. In a preferred embodiment, the lifting and lowering system includes a fluid operated cylinder having an extendable and retractable rod, and the adjustment subassembly similarly includes a fluid-operated cylinder, as described previously. A control valve provides communication to a source of hydraulic fluid pressure and to a reservoir. The control valve is movable between a first position and a second position. In the first position, the control valve is positioned to expose the lifting and lowering cylinder to reservoir, allowing retraction of its rod and movement of the mower conditioner frame to its lower position. Simultaneously, the control valve provides pressurized fluid to the adjustment cylinder, for retracting its rod and increasing the biasing force exerted by the spring to exert a maximum force urging the movable roller toward the other roller. When the valve is in its second position, fluid pressure is supplied to the lifting and lowering cylinder for raising the mower conditioner frame to its upper inoperative position. Simultaneously, the adjustment cylinder is exposed to reservoir for allowing extension of its rod and relieving the biasing force exerted by the spring. Accordingly, a mass of material can then be to passed through the rollers when the mower conditioner frame is raised.

BRIEF DESCRIPTION OF THE DRAWINGS

The drawings illustrate the best mode presently contemplated of carrying out the invention.

DETAILED DESCRIPTION OF THE PREFERRED EMBODIMENT

Figure 1:
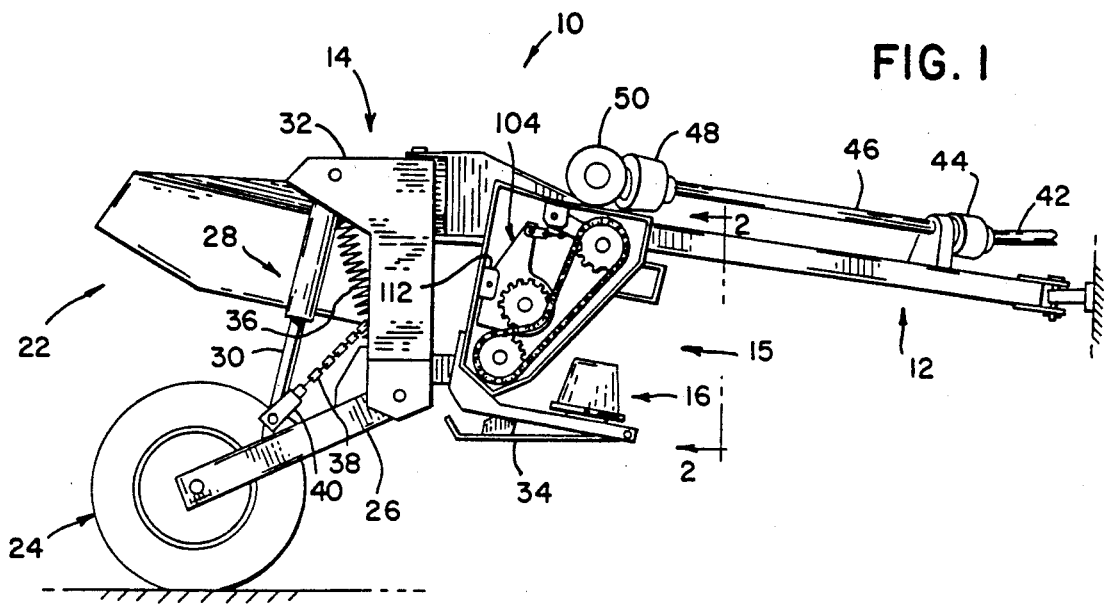
FIG. 1 is a side elevation view of a mower conditioner employing the invention, showing the mower conditioner frame in its raised position.
Figure 2:
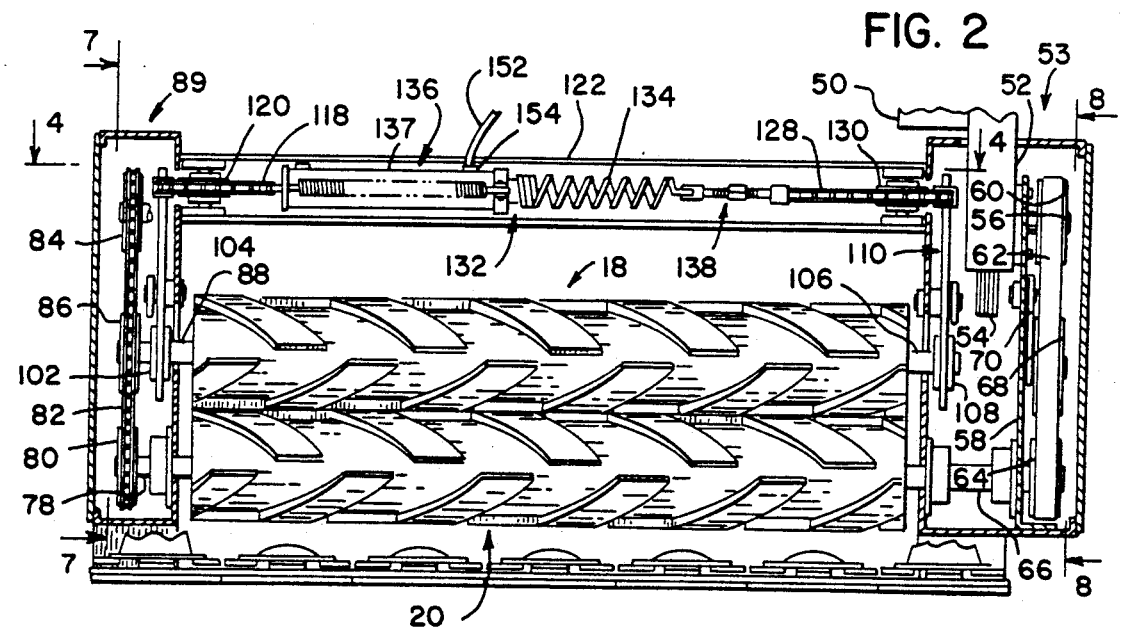
FIG. 2 is a partial front elevation view with portions in section, with reference being made to line 2—2 of FIG. 1, showing the adjustment subassembly of the invention and the conditioning rollers of the mower conditioner.

As shown in FIG. 1, a mower conditioner 10 generally includes an arm 12 typically connectable to a tractor or the like having a suitable hydraulic system and power take-off, as is known. Arm 12 is connected to a trailer frame 14, which carries a header assembly 15 including a cutter assembly 16. As shown in FIG. 2, a pair of conditioning rolls 18, 20 are also mounted to header assembly 15 rearwardly of cutting assembly 16. A forming chamber 22 (FIG. 1) is carried by frame 14 and located rearwardly of conditioning rolls 18, 20. A pair of wheels, one of which is shown at 24, are connected to frame 14 through a pair of legs, one of which is shown at 26, which are pivotably mounted to the lower end of frame 14. The wheels and legs, shown at 24, 26, respectively, are provided one on either side of frame 14.

A lifting a lowering system is provided between frame 14 and the legs, such as 26, for controlling the position of mower conditioner 10 between an upper inoperative position, as shown in FIG. 1, and a lower operative position. The lifting and lowering system generally includes a hydraulic cylinder 28 having an extendable and retractable rod 30. As shown in FIG. 1, the upper end of cylinder 28 is connected to an extension 32 formed on frame 14, and the lower end of rod 30 is connected to leg 26.

Header assembly 15 is pivotably mounted to frame 14. In this manner, a shoe 34 provided on cutter assembly 16 engages the ground when the trailer assembly is moved to its lower operative position. When shoe 34 engages rocks, bumps or other irregularities in the ground surface, header assembly 15 is thus pivotable in a counter-clockwise direction relative to frame 14 for allowing header 15 to ride over any such obstruction. A spring 36 has its upper end connected to rearward extension 32 of frame 14, and its lower end connected to header assembly 15. In this manner, a portion of the weight of header assembly 15 is counteracted by spring 36, thus providing a "floating" action of header assembly 15 over the ground.

A chain 38 is connected at one end to a yoke assembly 40 pivotably connected to leg 26, and is connected at its other end to header assembly 15. Chain 38 acts to pick up header assembly 15 when rod 30 of cylinder 28 is extended. Other satisfactory lifting mechanisms may be employed for lifting header assembly 15 during extension of rod 30 to raise mower conditioner 10 to its upper inoperative position. For example, a dog may be formed at the forward end of leg 26, engagable with header assembly 15 during the lifting operation for raising header assembly 15 to its position as shown in FIG. 1.

As shown in FIG. 1, a drive line includes a driveshaft 42 connectable at one end to the power take off of a tractor, and at its other end to a universal joint 44, which has a second driveshaft 46 extending therefrom. Shaft 46 is connected at its other end to a slip and overrunning clutch assembly 48, which provides power input to a gearbox 50. Referring to FIG. 2, gearbox 50 includes a lower portion 52 extending downwardly into the interior of a drive housing 53, which provides rotary output power through a vertical splined stub shaft 54 and horizontal splined stub shaft 56. A driveline arrangement (not shown) is provided between vertical splined stub shaft 54 and cutting assembly 16, for imparting rotation to the cutting elements associated with cutting assembly 16, in a manner as is known.

Figures 7, 8:
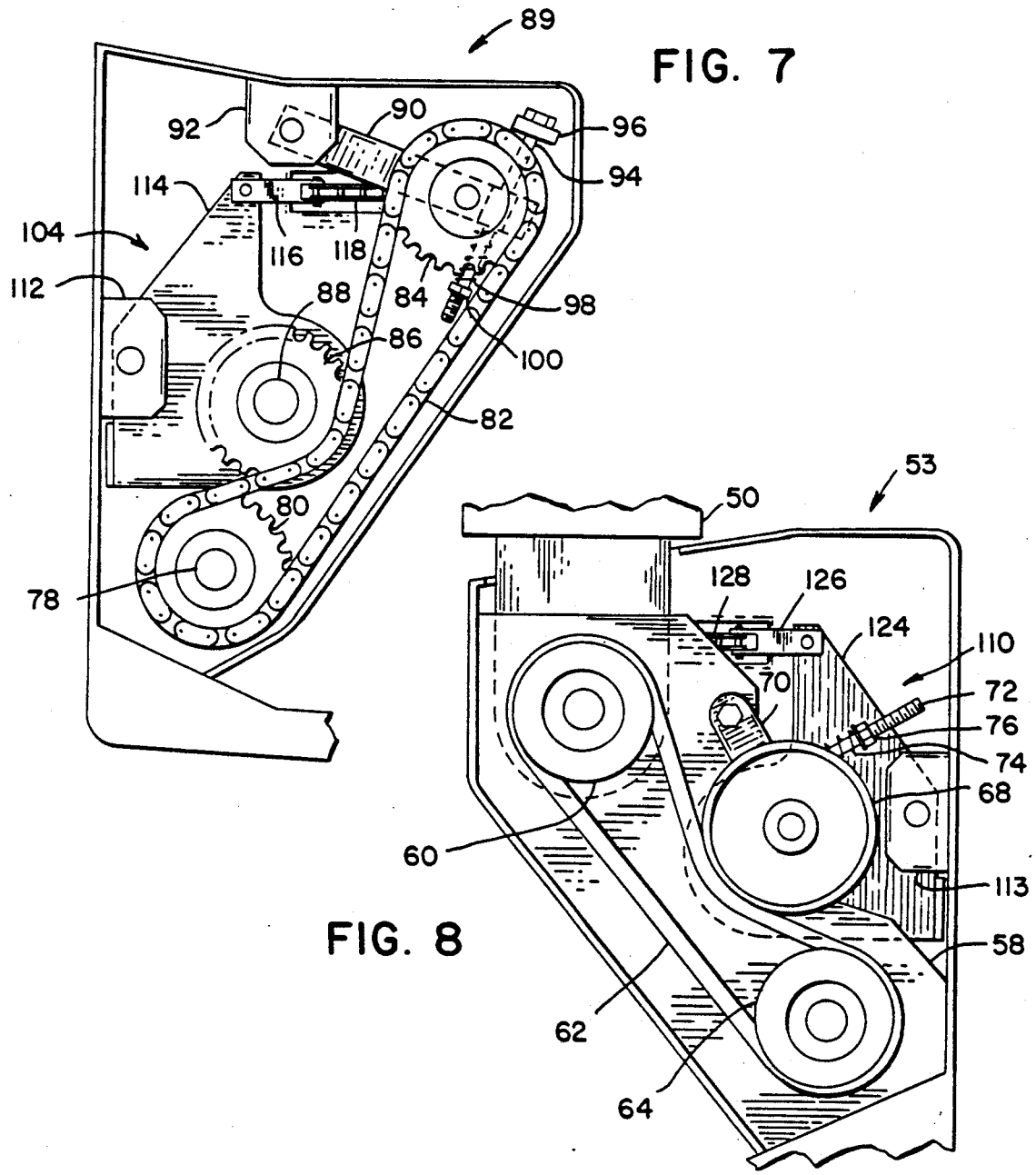
FIG. 7 is a partial enlarged end elevation view of the roll drive system as shown in FIG. 1.
FIG. 8 is a view similar to FIG. 7, showing the bottom roll drive system on the other side of the mower conditioner of FIG. 1.

A bearing plate 58 is mounted within drive housing 53, and horizontal stub shaft 56 extends through bearing plate 58. A drive sheave 60 is connected to horizontal stub shaft 56, and a drive belt 62 is trained around drive sheave 60. A driven sheave 64 is mounted to the end of a shaft 66 which extends from and is connected to lower roller 20. An idler sheave 68 is connected to an idler plate 70, which is pivotably mounted to bearing plate 58. As shown in FIG. 8, a bolt 72 extends through openings formed in inwardly facing tabs (not shown) in bearing plate 58 and in idler plate 70. A spring 74 is engaged with bolt 72, and a nut 76 secures spring 74 to bolt 72. Adjustment of the biasing force exerted by idler sheave 68 on belt 62 is accomplished by adjusting the position of nut 76 on bolt 72, thereby providing an increased or decreased force exerted by spring 74 on idler plate 70.

In operation, rotation imparted to drive sheave 60 through gearbox 52 and horizontal stub shaft 56 is transferred through belt 62 to driven sheave 64, resulting in rotation of lower roll shaft 66, and thereby lower roll 20.

Referring again to FIG. 2, the other end of lower roll 20 is provided with a shaft 78, to which a sprocket 80 is connected. A chain 82 is trained around sprocket 80, engaging an upper idler sprocket 84 and a top roll drive sprocket 86, which is fixed to a shaft 88 extending from the leftward end of upper roll 18. Sprockets 80, 84 and 86 are disposed within a drive housing 89. As shown in FIG. 7, idler sprocket 84 is connected to an idler arm 90, which is pivotably mounted to a boss 92 provided on drive housing 89. A bolt 94 passes through a plate 96 mounted to drive housing 89, and extends through an opening formed in idler arm 90. Bolt 94 extends through a spring 98, and a nut 100 is threadedly engaged with bolt 94. Adjusting the position of nut 100 on bolt 94 controls the position and biasing force exerted by idler sprocket 84 on chain 82.

In operation, rotation imparted to sprocket 80 from rotation of lower roll 20 is transferred through chain 82 to top roll drive sprocket 86, resulting in rotation of shaft 88 and thereby top roll 18.

Referring again to FIG. 2, shaft 88 provided at the leftward end of upper roll 18 extends through and is rotatably supported by a bearing assembly 102 connected to a mounting plate 104. Similarly, the rightward end of upper roll 18, from which a shaft 106 extends, is rotatably supported by a bearing assembly 108 fixed to a mounting plate 110.

Mounting plate 104 is pivotably connected to the inner plate forming the inner wall of the drive housing 89. Likewise, mounting plate 110 is pivotably connected to the inner plate forming the inner wall of drive housing 53. As shown in FIGS. 1 and 7, plate 104 is pivotably connected to a boss 112 mounted to the interior of drive housing 89. As shown in FIG. 8, plate 110 is pivotably connected to a boss 113 mounted to the interior of drive housing 53.

Mounting plates 104, 110 are substantially identical in construction and operation. As shown in FIGS. 1 and 7, mounting plate 104 includes an upwardly extending leg 114. A block 116 is connected to the upper end of leg 114, and an upper roll tension chain 118 is connected to block 116. Referring to FIG. 2, upper roll tension chain 118 is trained around a horizontally oriented sprocket 120, located in the leftward end of a channel-shaped housing 122.

In a similar manner, and with reference to FIGS. 2 and 8, mounting plate 110 includes an upwardly extending leg 124, and a block 126 is connected to the upper end of leg 124. An upper roll tension chain 128 is connected to block 126, and is trained around a horizontal sprocket 130 rotatably supported at the rightward end of housing 122.

Figure 3:
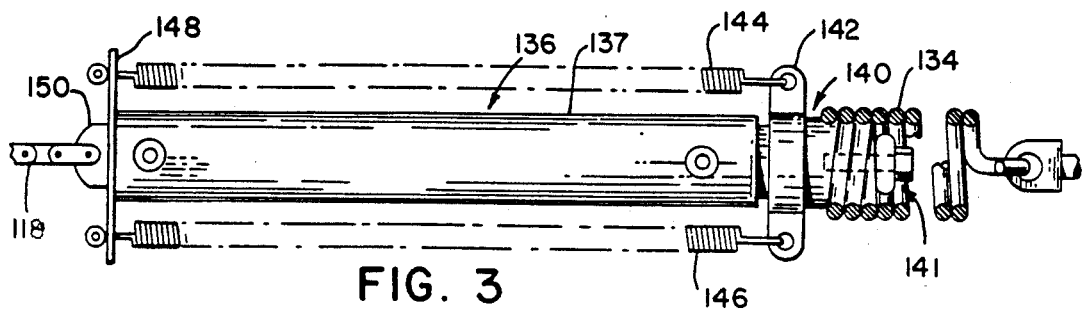
FIG. 3 is a partial plan view of the hydraulic cylinder and spring portion of the adjustment subassembly of the invention.
Figure 4:
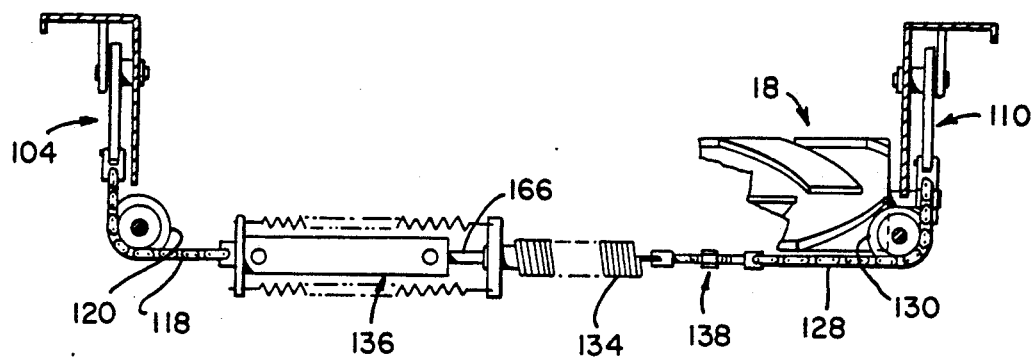
FIG. 4 is a partial plan view, reference being made to lines 4—4 of FIG. 2, showing connection of the adjustment subassembly to the roller mounting plates.

An adjustment subassembly 132 is disposed between the ends of chains 118, 128 located in housing 122. Subassembly 132 generally includes a spring 134 and a hydraulic cylinder assembly 136 comprising a cylinder 137 having an extendable and retractable piston rod mounted thereto. As shown in FIGS. 2 and 4, the rightward end of spring 134 is connected to an adjusting bolt assembly 138, to which is connected the leftward end of chain 128. Referring to FIG. 3, the leftward end of spring 134 is connected to a plug assembly 140 having external threads along a portion of its length to receive the end of spring 134. A washer and bolt assembly 141 is provided to fix plug assembly 140 to the end of a retractable and extendable rod associated with hydraulic cylinder assembly 136. Plug assembly 140 also includes a bracket assembly 142, and a pair of springs 144, 146 extend between bracket assembly 142 and a yoke 148 which is fixed to the cylinder portion of hydraulic cylinder assembly 136. A plate 150 is also fixed to the barrel or cylinder end of cylinder 137, and the rightward end of chain 118 is connected to plate 150.

Referring to FIG. 2, a hydraulic line 152 is connected to a port 154 provided on cylinder 137.

Figure 5:
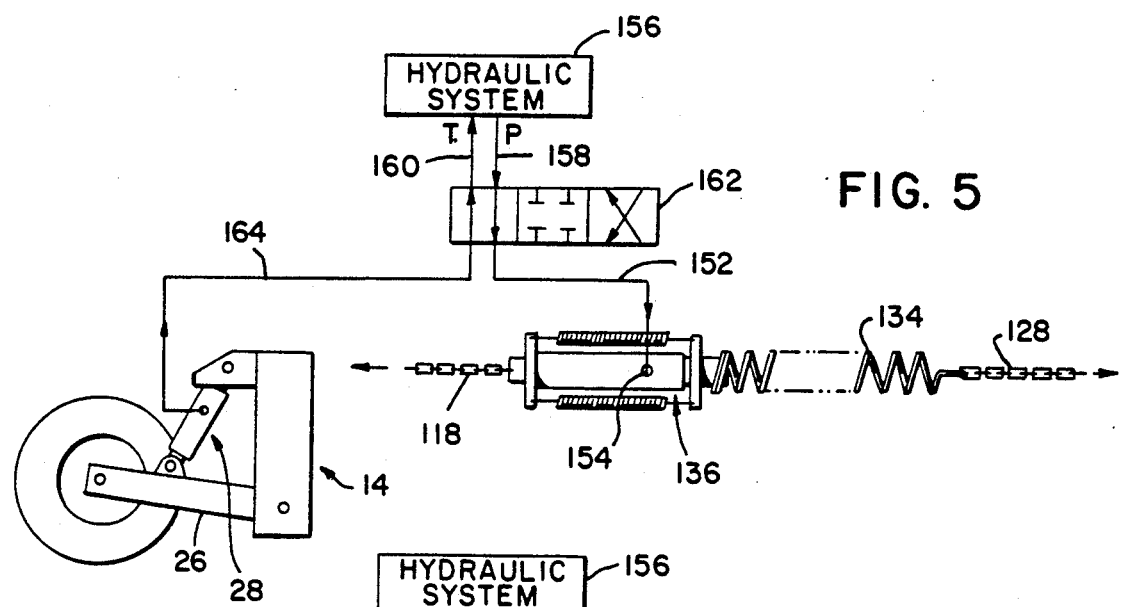
FIG. 5 is a schematic representation of the interconnection of the adjustment subassembly of the invention with the frame lifting and lowering cylinder, showing the rod of the lifting and lowering cylinder retracted and the rod of the adjustment cylinder retracted.
Figure 6:
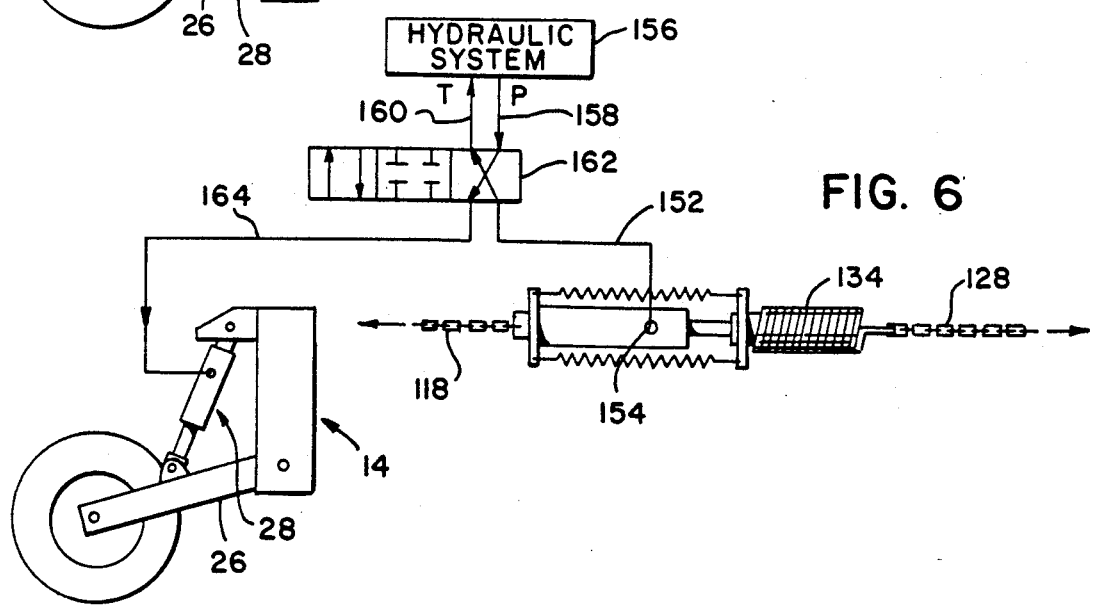
FIG. 6 is a view similar to FIG. 5, showing the rod of the lifting and lowering cylinder extended and the of rod the adjustment cylinder extended.

Reference is now made to FIGS. 5 and 6, which illustrate the interconnection of adjustment sub-assembly 132 and lifting and lowering cylinder 28. The tractor to which mower conditioner 10 is connected includes a hydraulic system 156. A pressure line 158 is adapted for connection to hydraulic system 156 for supplying hydraulic fluid pressure therefrom, and a return line 160 is connected to hydraulic system 156 for providing return flow of fluid to system 156. Lines 158, 160 are connected to a valve 162 associated with the hydraulic circuitry of the tractor, and line 152 extends between valve 162 and port 154 of cylinder 137. A line 164 extends between valve 162 and a port provided on lifting and lowering cylinder assembly 28. When valve 162 is in its FIG. 5 position, hydraulic fluid pressure is supplied through line 158 and valve 162 to line 152, to cause retraction of the piston rod associated with adjustment cylinder 136. In this position, the overall length of adjustment subassembly 132 is at a minimum, and spring 134 is moved to its extended position. A maximum biasing force is thus exerted by adjustment subassembly 132 on chains 118, 128. This biasing force is transferred to mounting plates 104, 110, to urge upper roll 18 toward lower roll 20 with the maximum available force. This occurs while lifting and lowering cylinder 28 is moved to its retracted position due to exposure of cylinder 28 to the reservoir of hydraulic system 156 through line 164, valve 162 and line 160. The weight of mower conditioner 10 moves frame 14 to its lower operative position, allowing normal operation of mower conditioner 10. Accordingly, the mating conditioning surfaces formed on upper and lower rolls 18, 20 cooperate to crimp or condition crop fed through the nip of rolls 18, 20 by cutting assembly 16.

In the event a mass of material is encountered which cannot normally pass through the nip of rolls 18, 20, the tractor is stopped and valve 162 moved to its position as shown in FIG. 6. In this position, hydraulic fluid pressure is supplied through valve 162 to line 164 and lifting and lowering cylinder 28, to extend its rod 30 to raise frame 14 to its upper inoperative position. Simultaneously, fluid pressure within cylinder 137 is relieved by exposing port 154 to return line 160 through valve 162. The biasing force exerted by spring 134 causes extension of the rod of cylinder assembly 136, shown at 166. The biasing force exerted by spring 134 on chains 118, 128 is thus totally relieved. Inputting power to the system to rotate rolls 18, 20 in this position allows the mass of material to pass through rolls 18, 20, resulting in movement of roller 18 away from roller 20 to allow such passage. Valve 162 is then returned to its FIG. 5 position for returning frame 14 to its lower operative position, and normal operation is resumed.

Referring to FIG. 3, springs 144, 146 act to maintain adjustment subassembly 132 in position within housing 122 when valve 162 is in its FIG. 6 position and rod 166 of adjustment cylinder 136 extended.

It is understood that various alternatives and modifications are contemplated as being within the scope of the following claims particularly pointing out and distinctly claiming the subject matter regarded as the invention.

We claim:

1. For a device including a pair of rollers forming a nip through which material passes, in which one of said rollers is mounted to a pivotable mounting plate so as to be movable toward and away from the other of said rollers, a system for biasing the movable one of said rollers against the other one of said rollers, comprising:
   a spring;
   connecting means extending between and interconnecting one end of said spring and said mounting plate;
   an adjustment assembly connected to the other end of said spring, said adjustment assembly including means for moving said spring between an extended position and a retracted position for adjusting the biasing force exerted by said spring on the movable one of said rollers; and
   remote actuating means for actuating said adjustment assembly from a location removed from said adjustment assembly.

2. The system of claim 1, wherein each end of the movable one of said rollers is supported by a pivotable mounting plate, and wherein said first-mentioned connecting means interconnects one end of said spring with one of said mounting plates, and further comprising second connecting means for interconnecting said adjustment assembly and the other of said mounting plates.

3. The system of claim 2, wherein said adjustment assembly comprises a fluid-operated cylinder having an extendable and retractable rod, and wherein said rod is connected to said spring, and wherein said remote actuating means causes selective supply of fluid pressure within said cylinder to result in extension or retraction of said rod and movement of said spring between its retracted and extended positions.

4. The system of claim 2, wherein said first-mentioned and said second connecting means comprises first and second chain means.

5. The system of claim 4, wherein each said mounting plate comprises a substantially planar member disposed in a plane substantially perpendicular to the longitudinal axis of said movable roller, and wherein said adjustment assembly and said spring are oriented along a longitudinal axis substantially parallel to the longitudinal axis of said roller.

6. The system of claim 5, further comprising sprocket means engageable with each said first and second chain means and rotatable about an axis substantially perpendicular to the longitudinal axis of said roller and of said adjustment assembly and said spring.

7. The system of claim 6, wherein each end of the movable one of said rollers is supported by a pivotable mounting plate, and wherein said first-mentioned connecting means interconnects one end of said spring with one of said mounting plates, and further comprising second connecting means for interconnecting said adjustment assembly and the other of said mounting plates.

8. For a crop conditioner having a frame and first and second rollers each rotatable about an axis of rotation, a mounting assembly for mounting each end of the first roller to the frame, comprising:
   a mounting plate to which an end of said first roller is rotatably mounted, said plate being supported for pivoting movement to said frame about a pivot axis spaced from the axis of rotation of said first roller, so that pivoting movement of said mounting plate causes movement of said first roller toward and away from said second roller;
   biasing means for exerting a biasing force on said mounting plate for urging said first roller toward said second roller;
   adjustment means for adjusting the biasing force exerted by said biasing means on said mounting plate; and
   remote actuating means for actuating said adjustment means from a location removed from said adjustment means.

9. The mounting assembly of claim 8, wherein said biasing means comprises an axially extending spring oriented along an axis substantially parallel to the longitudinal axis of said first roller and connected to said mounting plate.

10. The mounting assembly of claim 9, wherein said adjustment means comprises a cylinder having a retractable and extendable rod mounted for movement toward and away therefrom, wherein said cylinder is connected to the mounting plate associated with the mounting assembly of said first roller, and wherein said retractable and extendable rod is connected to an end of said spring, and further comprising means for controlling the position of said retractable and extendable rod relative to said cylinder for adjusting the biasing force exerted by said spring.

11. A method of mounting a first movable roller of a crop conditioner to the frame of said conditioner so that the first roller is movable toward and away from a second roller mounted to the frame of said conditioner, comprising the steps of:
   providing a mounting plate;
   rotatably connecting an end of said first roller to said mounting plate;
   pivotably connecting said mounting plate to said frame;
   connecting a spring to said mounting plate for exerting a biasing force on said mounting plate for urging said first roller toward said second roller; and
   adjusting the position of said spring from a location removed therefrom for adjusting the biasing force exerted by said spring on said mounting plate.

12. A crop conditioner, comprising:
   a frame supported by ground-engaging wheels and being movable relative to said wheels between an operative lower position and an inoperative upper position;
   lowering and lifting means for moving said frame between its lower and upper positions;
   a first roller and a second roller mounted to said frame, said first roller being mounted to said frame for movement toward and away from said second roller;
   selectively adjustable biasing means for selectively urging said first roller toward said second roller; and
   control means interconnected with said lifting and lowering means and said selectively adjustable biasing means for actuating said biasing means for urging said first roller towards said second roller in response to said lifting and lowering means moving said frame to its lower position.

13. The conditioner of claim 12, wherein said selectively adjustable biasing means comprises a fluid-operated cylinder having an extendable and retractable rod connected to an end of a spring, said cylinder and said spring being connected through movable mounting means to the ends of said first roller, and wherein said lowering and lifting means comprises a fluid-operated cylinder having an extendable and retractable rod for moving said frame between its upper and lower positions.

14. The conditioner of claim 13, wherein said control means comprises a valve interposed between said fluid-operated cylinders and a hydraulic system including a reservoir and a source of fluid pressure.

15. The conditioner of claim 14, wherein said valve is movable between a first position and a second position, said valve in its first position acting to supply fluid pressure to said first-mentioned cylinder so as to retract its rod to thereby extend the spring connected thereto to urge said first roller towards said second roller, and to connect said second-mentioned cylinder to said reservoir so as to retract its rod to move said frame to its lower position, said valve in its second position acting to connect said first-mentioned cylinder to said reservoir and thereby allow extension of its rod in response to a biasing force exerted by said spring, and to supply fluid pressure to said second-mentioned cylinder to extend its rod to move said frame to its upper position.

16. For a crop conditioner including a frame and a pair of conditioning rollers, at least one of which is mounted to said frame for movement toward and away from the other of said rollers, a method of adjusting the position of the movable one of said rollers in response to the position of said frame, comprising the steps of:

providing a lifting and lowering system for moving said frame between an inoperative upper position and an operative lower position;

providing a mounting assembly, for movably mounting the movable one of said rollers to said frame, said mounting assembly including an adjustment sub-assembly;

providing a control means for controlling said lifting and lowering system to control the position of said frame; and interconnecting said control means and said adjustment subassembly such that operation of said lifting and lowering system to move said frame to its lower operative position results in actuation of said adjustment subassembly to move the movable one of said rollers toward the other one of said rollers, and operation of said lifting and lowering system to move said frame to its upper inoperative position results in actuation of said adjustment subassembly to allow movement of the movable one of said rollers away from the other one of said rollers.

17. The method of claim 16, wherein the step of providing a mounting assembly comprises connecting an end of a spring to the extendable and retractable rod of a hydraulic cylinder and connecting said cylinder and said spring to movable mounting means rotatably supporting the ends of said roller.

18. The method claim 17, wherein the step of providing a lifting and lowering system comprises providing a fluid-operated cylinder having an extendable and retractable rod for moving said frame between its upper and lower positions.

19. The method of claim 18, wherein the step of providing a control means comprises providing a valve interposed between said lifting and lowering cylinder and a hydraulic system including a source of fluid pressure and a reservoir.

20. The method of claim 19, wherein the step of interconnecting said adjustment subassembly and said control means comprises connecting said valve to said cylinders such that said valve is movable between a first position and a second position, said valve in its first position acting to supply fluid pressure to said first-mentioned cylinder so as to retract its rod to thereby extend the spring connected thereto to urge said first roller toward said second roller, and to connect said second-mentioned cylinder to said reservoir so as to retract its rod to move said frame to its lower position, said valve in its second position acting to connect said first-mentioned cylinder to said reservoir and thereby allow extension of its rod in response to a biasing force exerted by said spring, and to supply fluid pressure to said second-mentioned cylinder to extend its rod to move said frame to its upper position.

21. A crop conditioner, comprising:

a frame;

a pair of rollers;

mounting structure for rotatably mounting said rollers to said frame, said mounting structure providing movement of one of said rollers toward and away from the other roller; and a system for selectively biasing the movable one of said rollers toward the other roller, comprising:

a spring;

connecting means extending between and interconnecting said spring and said mounting structure;

an adjustment assembly connected to said spring, and including means for moving said spring between an extended position and a retracted position for adjusting the biasing force exerted by said spring on the movable one of said rollers; and remote actuating means for actuating said adjustment assembly from a location removed from said adjustment assembly.

* * * * *